United States Patent [19]

van der Akker et al.

[11] Patent Number: 4,652,984
[45] Date of Patent: Mar. 24, 1987

[54] SELF-OSCILLATING POWER-SUPPLY CIRCUIT

[75] Inventors: Jouw van der Akker; Joseph A. M. Plagge, both of Drachten, Netherlands

[73] Assignee: U.S. Philips Corporation, New York, N.Y.

[21] Appl. No.: 736,630

[22] Filed: May 20, 1985

[30] Foreign Application Priority Data

Jan. 22, 1985 [NL] Netherlands ............................ 8500154

[51] Int. Cl.$^4$ .......................................... H02M 3/335
[52] U.S. Cl. ......................................... 363/18; 363/19; 320/21
[58] Field of Search ............................ 363/19, 21, 18; 323/284, 285, 299; 320/21, 40

[56] References Cited

U.S. PATENT DOCUMENTS

| | | | |
|---|---|---|---|
| 4,131,843 | 12/1978 | Koyama et al. | 323/285 X |
| 4,316,242 | 2/1982 | Colangelo et al. | 363/21 |
| 4,378,585 | 3/1983 | Bote | 363/19 |
| 4,422,032 | 12/1983 | Kakumoto et al. | 363/19 X |
| 4,441,147 | 4/1984 | Schwarz | 363/21 |
| 4,504,775 | 3/1985 | Becker | 363/19 X |
| 4,523,139 | 6/1985 | Schwarz et al. | 363/21 X |
| 4,585,988 | 4/1986 | Nakai | 323/285 |

Primary Examiner—Patrick R. Salce
Assistant Examiner—Marc S. Hoff
Attorney, Agent, or Firm—Robert T. Mayer; Bernard Franzblau

[57] ABSTRACT

A circuit for energizing a load (10) with different input voltages, comprises a transformer (6), having a primary winding ($n_1$), in series with a switching transistor ($T_1$) the load (10), and a current sensing resistor ($R_2$), between the input terminals. The secondary winding ($n_2$), in series with a diode ($D_1$) connected is in parallel with the load. A starting resistor ($R_1$) starts the circuit oscillating via a positive-feedback loop, comprising, in series, a first resistor ($R_4$), a capacitor ($C_1$) and a second resistor ($R_5$). This feedback loop is coupled between one end of the secondary winding and the base of the switching transistor. A control transistor ($T_2$), whose base is connected to the current-sensing resistor ($R_2$), turns off the switching transistor as a function of the primary current. The energy stored in the transformer is then delivered to the load by an output current in the secondary winding. This output current increases as the input voltage increases as a result of an increasing saturation of the switching transistor via the positive feedback. A zener diode ($Z_1$) is coupled to the switching transistor so that, above a specific input voltage, the zener diode turns on and drains away the base current of the switching transistor so as to limit the output current.

18 Claims, 7 Drawing Figures

SELF-OSCILLATING POWER-SUPPLY CIRCUIT

BACKGROUND OF THE INVENTION

This invention relates to a self-oscillating power-supply circuit for supplying a load with input voltages of different values and comprising a transformer with a primary winding and a secondary winding. The primary winding is in series with the main-current path of a switching transistor between two terminals to which the input voltage is to be applied. The switching transistor is turned off by means of a control transistor depending on a current proportional to the input voltage. The secondary winding is in series with a diode and this series combination is arranged in parallel with the load. A positive feedback loop comprising a capacitor in series with a first resistor is coupled between one end of the secondary winding and the base of the switching transistor.

Such a power-supply circuit may be used for charging batteries and powering electronic equipment. In particular, such a power-supply circuit may be employed in an electric shaver, in which the circuit supplies the charging current for the batteries and the current for the d.c. motor if the batteries are exhausted and the shaver is powered directly from the AC supply voltage.

A power-supply circuit of the type defined in the opening paragraph is disclosed in U.S. Pat. No. 4,504,775. If the input voltage is applied to this circuit a small current is fed to the base of the switching transistor via a starting resistor and drives this transistor partly into conduction. This results in a small primary current in the primary winding of the transformer. This current induces a voltage in the secondary winding, as a result of which a larger current is applied to the base of the switching transistor via the positive feedback between the secondary winding and the base of the switching transistor. In this way the switching transistor is rapidly driven into full conduction. During the so-called "forward" interval the primary current increases as a linear function of time. In the known circuit a resistor is arranged in the emitter line of the switching transistor, which resistor is connected in parallel with the base-emitter junction of a control transistor. For a specific value of the primary current the control transistor is then turned on and the switching transistor is consequently turned off. During the so-called "flyback" interval the energy stored in the transformer produces a secondary current in the secondary winding. This current constitutes the charging current for the batteries or directly powers the relevant apparatus. The secondary current decreases as a linear function of time until the switching transistor is turned on again.

In this way the power-supply circuit forms a self-oscillating power supply which supplies a constant average output current at a specific input voltage and a constant output voltage. However, this output current depends on the input voltage. For example, if the input voltage is higher, the primary current increases at a faster rate during the forward interval so that the level at which the switching transistor is turned off is reached more rapidly. Since the flyback interval is substantially constant, this leads to a higher oscillating frequency and hence to a larger average output current.

In addition, an increasing input voltage, as a result of the positive feedback between the secondary winding and the base of the switching transistor, leads to an increasing base current in this transistor. Increasing input voltages therefore drive the switching transistor further towards saturation so that after the primary current has reached the turn-off level the switching transistor is turned off with an increasing delay. As a result, the primary current becomes increasingly higher at increasing input voltages, which also results in an increasing average output current.

However, the output current of the power-supply circuit should remain within a specific range in order to preclude damage to the batteries and/or the apparatus as a result of an excessive current at high input voltages and in order to enable an adequate charging current for the batteries and/or power-supply current for the apparatus to be obtained at low input voltages.

To enable the power-supply circuit to be used with different AC supply voltages in various countries without adaptation or switching over, the known circuit employs a supply-voltage compensation by means of which the values of the primary current for which the switching transistor is turned off are reduced as the input voltage increases. This is effected, for example, by applying a current which is proportional to the input voltage to the resistor in the emitter line of the switching transistor. As a result the control transistor is turned on for values of the primary current which decrease as the input voltage increases.

SUMMARY OF THE INVENTION

The invention aims at precluding the turn-off delay from increasing as the input voltages in such a self-oscillating power supply increase. Tests have revealed that of the two effects which result from increasing input voltages, namely an increasing switching frequency and an increasing turn-off delay, the latter is the principal cause of the increase in output current as the input voltage increases. Moreover, it has been found that by eliminating the increase in turn-off delay the compensation for the increase in switching frequency may even be dispensed with.

Therefore, it is an object of the invention to provide a self-oscillating power-supply circuit which in a simple manner, provides a compensation for increases in turn-off delay as a result of input-voltage increases, thus to enable the circuit to be used over a larger range of input voltages.

In accordance with the invention a self-oscillating power supply circuit of the type defined in the opening paragraph is characterized in that the positive feedback loop further comprises a second resistor in a series connection with the capacitor and the first resistor and a zener diode connected between a circuit point in the series connection of the first resistor and the second resistor and that end of the main current path of the switching transistor which is remote from the primary winding. The capacitor provides d.c. isolation between the circuit point and the secondary winding. At a specific input voltage the zener diode is turned on so that, for higher input voltages, an otherwise increase in base current is drained to the emitter of the switching transistor via the zener diode. As a result, the switching transistor is always saturated to substantially the same extent. Thus, the turn-off delay does not increase when input voltage increases so that the output current becomes less dependent on the input voltage.

The base-current compensation in the power-supply circuit in accordance with the invention may be combined in a suitable manner with a compensation for increases in switching frequency of the switching transistor as a result of input voltage increases. The power-supply circuit is then characterized in that the circuit comprises compensation means which, for increasing values of the input voltage, turn off the switching transistor at decreasing values of the current through the primary winding. In accordance with a further embodiment said compensation means may comprise a third resistor which is connected in series with the main current path of the switching transistor and is connected to one (e.g. the negative) input-voltage terminal. The third resistor is coupled to the control electrode of the control transistor via the collector-emitter path of a transistor whose base is connected to its collector, its emitter, and the other (e.g. the positive) input-voltage terminal by a fourth resistor, a fifth resistor, and a sixth resistor, respectively. The control electrode is connected to the one (negative) input-voltage terminal by a seventh resistor. Another embodiment may be characterized in that the compensation means comprise an eighth resistor which, in series with the main current path of the switching transistor, is connected to the one (negative) input-voltage terminal. The eighth resistor is coupled to the control electrode of the control transistor via the collector-emitter path of a transistor whose base is connected to the collector and the emitter by a ninth resistor and a tenth resistor, respectively, a second capacitor being arranged in parallel with the ninth resistor. With respect to the compensation means, yet another embodiment may be characterized in that said one end of the secondary winding is connected to the one (negative) input-voltage terminal by the series arrangement of an eleventh resistor and a third capacitor, the junction point of said eleventh resistor and said third capacitor being coupled to the control electrode of the control transistor.

BRIEF DESCRIPTION OF THE DRAWING

Embodiments of the invention will now be described in more detail, by way of example, with reference to the accompanying drawings, in which.

DESCRIPTION OF THE PREFERRED EMBODIMENTS

Figure 1:
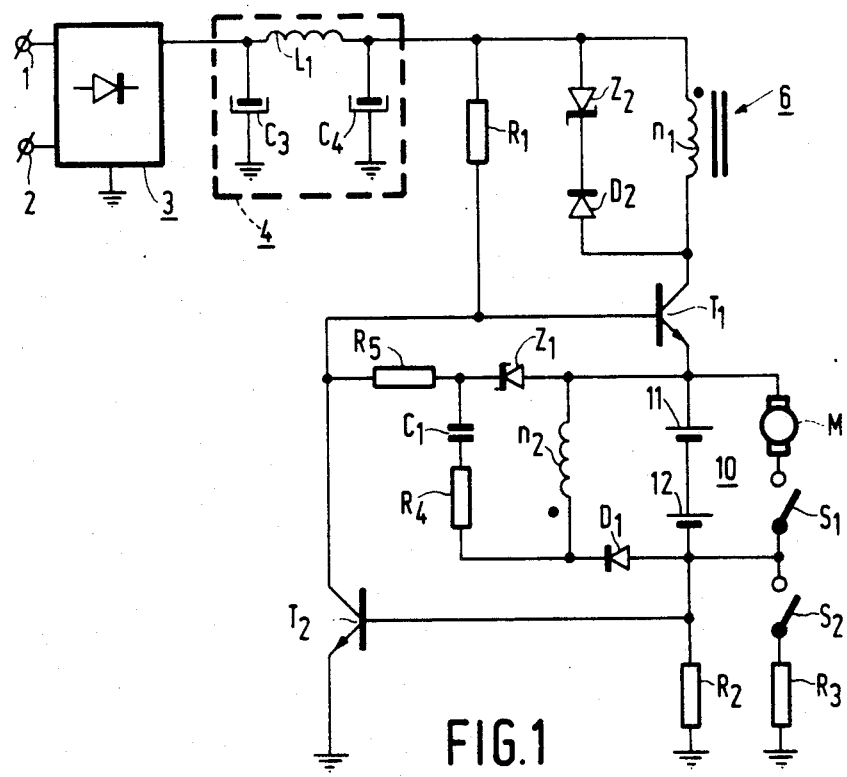
FIG. 1 shows a power-supply circuit in accordance with a first embodiment of the invention.

FIG. 1 shows a self-oscillating power-supply circuit in accordance with a first embodiment of the invention. Only those parts of the circuit are shown which are relevant to the operation of the circuit in accordance with the invention. The control circuit for turning off the power-supply circuit when the batteries are full is not shown. The circuit comprises two input terminals 1 and 2 to which the supply voltage, which may be an alternating voltage or a direct voltage, is applied. This voltage is supplied to a rectifier bridge 3. The rectifier voltage is smoothed by means of a filter 4, which in the present example comprises two capacitors $C_3$, $C_4$ and a coil $L_1$. The smoothed voltage is applied to the primary winding $n_1$ of a transformer having a core 6. A zener diode $Z_2$ in series with a diode $D_2$ is connected in parallel with the primary winding $n_1$ to preclude voltage transients when the current through the primary winding is switched off. The collector-emitter path of a switching transistor $T_1$ is connected in series with the primary winding $n_1$. The switching transistor has its base connected to the positive input-voltage terminal by means of a resistor $R_1$ having a high resistance. The resistor $R_1$ is a starting resistor for starting the circuit when the supply voltage is applied. It is to be noted that the circuit can also be started in other ways than by means of the resistor $R_1$. The series arrangement of a load 10 and a resistor $R_2$ connects the emitter of the switching transistor $T_1$ to the negative input-voltage terminal. In the present example the load 10 comprises two nickel-cadmium batteries 11 and 12, with which a d.c. motor M can be connected in parallel by means of a switch $S_1$. In that case the switch $S_2$ simultaneously connects a resistor $R_3$ in parallel with the resistor $R_2$. The base-emitter junction of a control transistor $T_2$ is arranged in parallel with the resistor $R_2$. The control transistor has its collector connected to the base of the switching transistor $T_1$. The secondary winding $n_2$ is in series circuit with a diode $D_1$. This series circuit is arranged in parallel with the load 10. A series arrangement of a resistor $R_4$, a capacitor $C_1$ and a resistor $R_5$ is connected between the junction point of the secondary winding $n_2$ and the diode $D_1$, and the base of the switching transistor $T_1$. The cathode of a zener diode $Z_1$ is connected to the junction point of the resistor $R_5$ and the capacitor $C_1$ and the anode of this zener diode is connected to the emitter of the switching transistor $T_1$. It is to be noted that the resistor $R_4$ and the capacitor $C_1$ may be interchanged.

The circuit operates as follows. It is assumed that the switches $S_1$ and $S_2$ are open and the circuit consequently supplies the charging current for the batteries 11 and 12. When the AC supply voltage is applied to the input terminals 1 and 2 a very small current will flow into the base of the transistor $T_1$ via the large starting resistor $R_1$. This produces a small collector current, which also flows through the primary winding $n_1$ of the transformer 6. In the secondary winding $n_2$ this results in an increase of the voltage on the end which is connected to the diode $D_1$. By means of the positive feedback loop, which comprises the resistors $R_4$ and $R_5$ and the capacitor $C_1$ and which is arranged between that end of the secondary winding $n_2$ which is positive during the forward interval and the base of the transistor $T_1$, a larger base current is applied to the transistor $T_1$, which current drives this transistor further into conduction. The positive feedback then ensures that the transistor $T_1$ is rapidly saturated. During the forward interval the primary current increases as a linear function of time. At a level of the primary current which is determined by the resistance of the resistor $R_2$, the control transistor $T_2$ is turned on so that the switching transistor $T_1$ is turned off. It is to be noted that the control transistor $T_2$ can also be turned on depending on the value of the primary current in a manner other than by means of a resistor $R_2$. As the primary current becomes zero because the transistor $T_1$ is turned off, the polarity of the voltage across the secondary winding $n_2$ is reversed. The end of the winding $n_2$ which is connected to the diode $D_1$ then becomes negative so that the diode $D_1$ is turned on. The energy stored in the transformer 6 during the forward internal is then delivered to the batteries 11 and 12 in the form of a charging current via the diode $D_1$ in the flyback interval. This current decreases to zero as a linear function of time, after which the switching transistor $T_1$ is turned on again.

During the forward interval the maximum voltage on that end of the secondary winding $n_2$ which is connected to the diode $D_1$ is dictated by the input voltage and the transformation ratio of the transformer 6. For comparatively low input voltages the zener diode $Z_1$ does not yet conduct. The base current of the switching transistor $T_1$ is then determined by the voltage difference between the positive end of the winding $n_2$ and the base of the switching transistor $T_1$ and the resistance of the resistors $R_4$ and $R_5$. When the input voltage increases, the voltage at the junction point between the capacitor $C_1$ and the resistor $R_5$ increases as a result of the increasing base current, so that the zener diode $Z_1$ is turned on at a specific input voltage. The base current is then determined by the difference between the zener voltage and the base-emitter voltage of the transistor $T_1$ and by the resistance value of the resistor $R_5$. As the input voltage increases further, the otherwise further increase in base current is drained to the emitter of transistor $T_1$ via the zener diode $Z_1$. The base current of the transistor $T_1$ therefore remains constant so that the switching transistor $T_1$ is not further saturated for increasing input voltages. This ensures that the turn-off delay cannot increase for increasing input voltages. Thus, the output current of the circuit remains within a range in which it cannot damage the batteries 11 and 12 and the electronic circuitry.

Apart from the base-current compensation the zener diode $Z_1$ has another advantage. During the forward interval that end of the capacitor $C_1$ which is connected to the secondary winding $n_2$ is positive relative to the end which is connected to the base of the transistor $T_1$. At the beginning of the flyback interval the polarity of the voltage across the secondary winding $n_2$ is reversed and the voltage on that end of the winding $n_2$ which is connected to the diode $D_1$ becomes negative. The voltage on the base of the transistor $T_1$ would then also become negative via the capacitor $C_1$, as a result of which starting would take more time during the next forward interval. This is avoided in that during the flyback interval the zener diode $Z_1$ clamps the junction point between the capacitor $C_1$ and $R_5$ at a voltage drop which is one diode voltage lower than the battery voltage.

If the switches $S_1$ and $S_2$ are closed, the circuit directly supplies the direct current for the d.c. motor M. As the resistor $R_3$ is arranged in parallel with the resistor $R_2$, the control transistor $T_2$ is turned on and the switching transistor $T_1$ is consequently turned off at a larger primary current. In this situation the circuit supplies a larger output current. Otherwise, the circuit operates in the same way.

Figure 2:
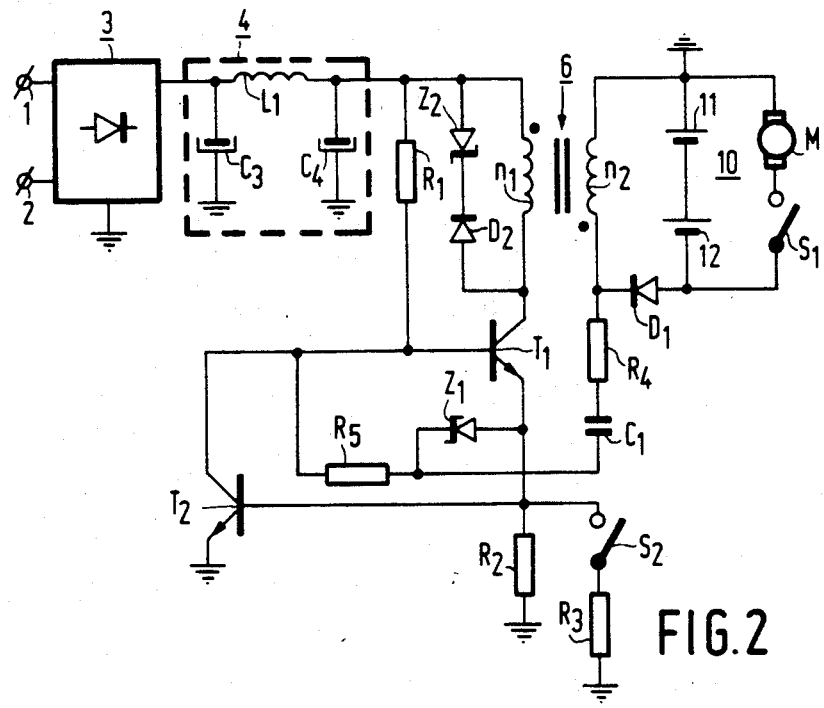
FIG. 2 shows a power-supply circuit in accordance with a second embodiment of the invention.

FIG. 2 shows a power-supply circuit in accordance with a second embodiment of the invention. Identical parts bear the same reference numerals as in FIG. 1. The present embodiment differs from that shown in FIG. 1 in that the load 10 is not arranged in the emitter line of the switching transistor $T_1$ but is arranged separately from this line. The emitter of the transistor $T_1$ is connected to the negative input-voltage terminal via the resistor $R_2$. By means of a switch $S_2$ a resistor $R_3$ can be coupled in parallel with the resistor $R_2$. The batteries 11 and 12 are connected in parallel with the series arrangement of the secondary winding $n_2$ and the diode $D_1$. By means of a switch $S_1$, which is actuated simultaneously with the switch $S_2$, a d.c. motor M can be connected in parallel with the batteries 11 and 12. Again a positive-feedback loop comprising the resistors $R_4$ and $R_5$ and the capacitor $C_1$ is connected between that end of the winding $n_2$ which is positive during the forward interval and the base of the transistor $T_1$. The zener diode $Z_1$ is connected between the junction point of the resistor $R_5$ and the capacitor $C_1$ and the emitter of the transistor $T_1$ and thus provides base-current compensation. The circuit operates in the same way as that shown in FIG. 1, except that during the flyback interval the zener diode $Z_1$ does not clamp the base of the transistor $T_1$ at a voltage which is one diode voltage drop lower than the battery voltage.

Figure 3:
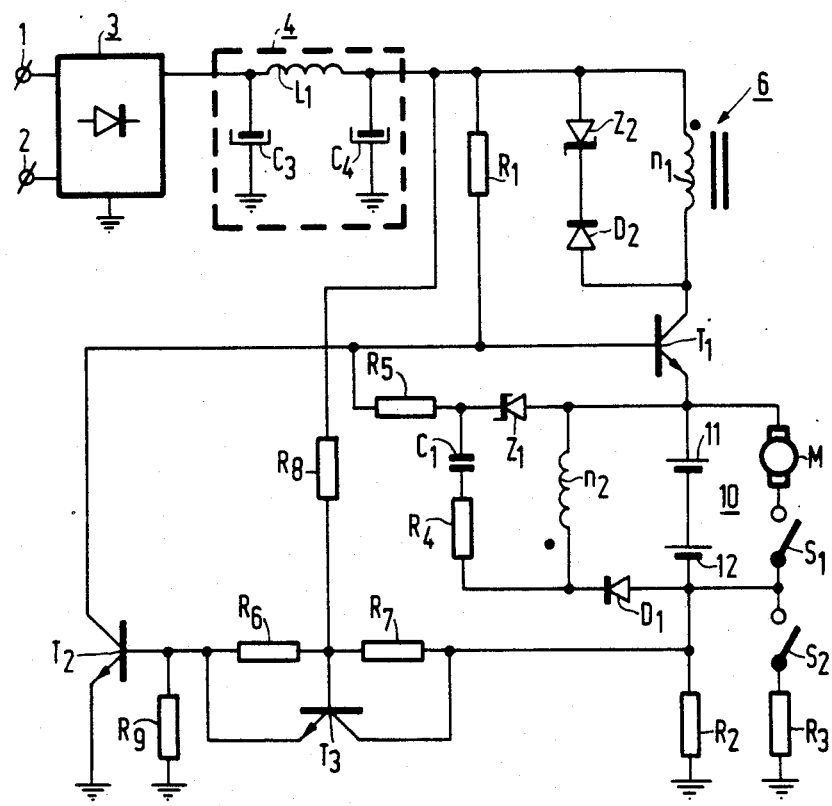
FIG. 3 shows a power-supply circuit in accordance with a third embodiment of the invention.

It has been found that by means of the base-current compensation the dependence of the output current on the input voltage can be reduced to such an extent that the output current remains within the desired range for a correct operation of the circuit. In addition to the base-current compensation, the power-supply circuit in accordance with the invention can provide compensation for an increase in the switching frequency of the switching transistor $T_1$ when the input voltage increases. FIG. 3 shows a power-supply circuit with such a compensation, which yields an output current with a very good overall supply-voltage compensation. Identical parts bear the same reference numerals as in FIG. 1. A base-emitter voltage multiplier is arranged in the base line of the control transistor $T_2$ and comprises a transistor $T_3$, which has a resistor $R_6$ arranged between its base and its emitter and a resistor $R_7$ between its base and its collector. The base of the transistor $T_3$ is connected to the positive input-voltage terminal by means of a resistor $R_8$ having a high resistance. A resistor $R_9$ is arranged between the emitter of the transistor $T_3$ and the negative input-voltage terminal. The voltage division by means of the resistors $R_8$, $R_6$ and $R_9$ results in an input-voltage-dependent voltage across the resistor $R_6$ and hence across the base-emitter junction of the transistor $T_3$.

The voltage across the entire multiplier is a fraction higher than the voltage across the base emitter junction of the transistor $T_3$, which fraction is defined by the ratio between the resistance values of the resistors $R_7$ and $R_6$. The voltage across the resistor $R_2$ at which the control transistor $T_2$ is driven into conduction is equal to the sum of the voltages which appear across the base-emitter junction of the transistor $T_2$ and the multiplier $T_3$, $R_6$ and $R_7$ when the transistors $T_2$ and $T_3$ are conductive, minus the input-voltage-dependent bias of the multiplier $T_3$, $R_6$ and $R_7$. The level at which the primary current is switched off therefore decreases as the input voltage increases. This compensates for the effect of the increasing output current as a result of the increase in the switching frequency of the switching transistor $T_1$ in response to increasing input voltages. Further, the circuit operates in the same way as that shown in FIG. 1.

Figure 4:
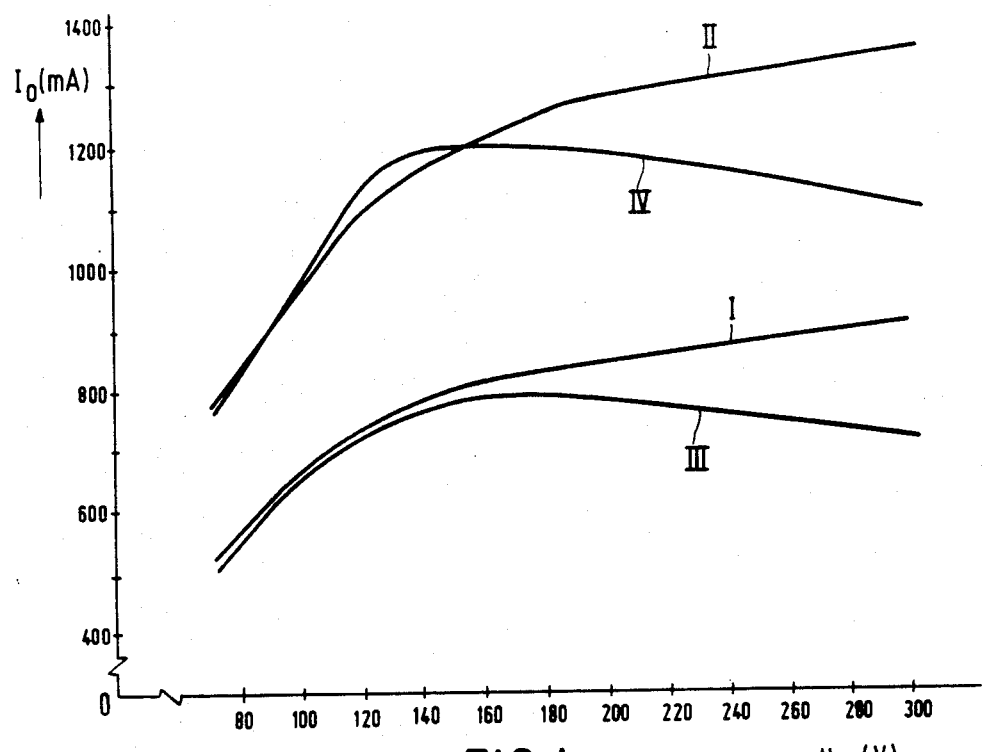
FIG. 4 shows some characteristic curves relating to the circuits shown in FIG. 1 and FIG. 3.

In FIG. 4 the output current $I_o$ is plotted as a function of the AC supply voltage for equally dimensioned circuits as shown in FIG. 1 and FIG. 3. The characteristics I and II respectively represent the load current and the motor current for the circuit of FIG. 1 and the characteristics III and IV respectively represent the load current and the motor current for the circuit shown in FIG. 3. From the characteristics I and II it is evident that when the base-current compensation becomes operative, in the present case at an input voltage of approximately 120 to 130 V, the output current exhibits less of a variation in the range of input voltages above this voltage than it does in the range of input voltages below this voltage. The characteristics III and IV show that the base-current compensation in conjunction with a switching-frequency compensation leads to an even smaller variation of the output current as a function of the input voltage.

Figure 5:
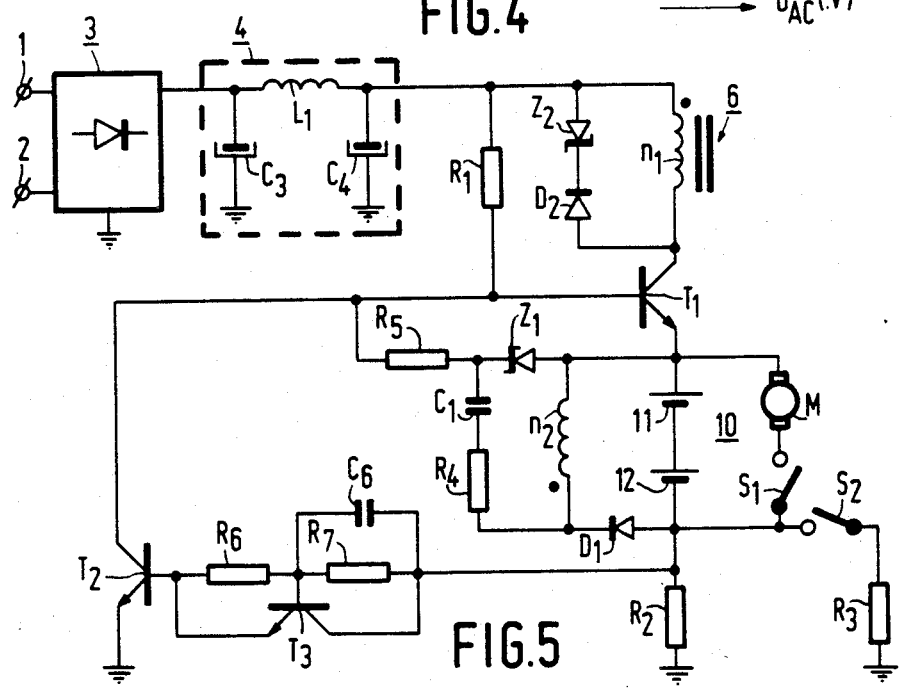
FIG. 5 shows a power-supply circuit in accordance with a fourth embodiment of the invention.

FIG. 5 shows a circuit in accordance with an embodiment of the invention derived from the circuit shown in FIG. 3. Identical parts bear the same reference numerals as in FIG. 3. The circuit differs from that shown in FIG. 3 in that the base of the transistor $T_3$ is no longer connected to the positive-input voltage terminal via a resistor $R_8$ and in that the resistor $R_9$ is no longer arranged across the base-emitter junction of the transistor $T_2$. However, now a resistor $R_7$ is arranged across a capacitor $C_6$. As explained already, the voltage across the resistor $R_2$ increases less rapidly at comparatively low input voltages than at comparatively high input voltages. This means that the frequency of the voltage across this resistor increases as the input voltage increases. The capacitor $C_6$ across the resistor $R_7$ constitutes a high impedance for comparatively low frequencies and it constitutes a short-circuit for comparatively high frequencies. As a result of this, the voltage across the multiplier $T_3$, $R_6$, $R_7$ decreases as the input voltage increases so that the control transistor $T_2$ is turned on at a decreasing level of the primary current and, consequently, the switching transistor $T_1$ is turned off at a decreasing level. This results in a compensation for the increasing switching frequency in addition to the base current compensation.

Figure 6:
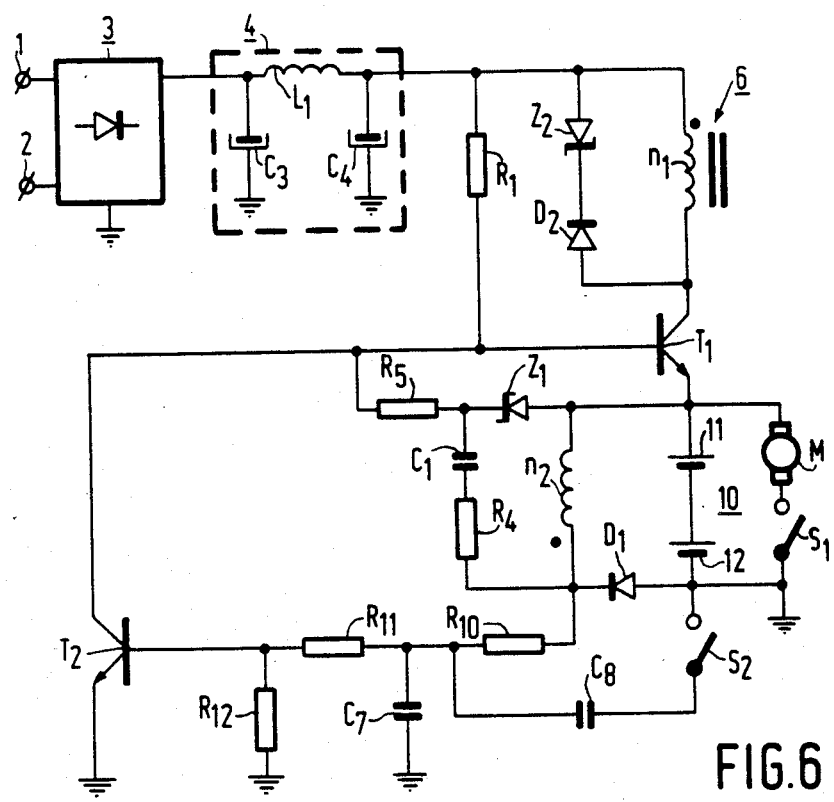
FIG. 6 shows a power-supply circuit in accordance with a fifth embodiment of the invention.
Figure 7:
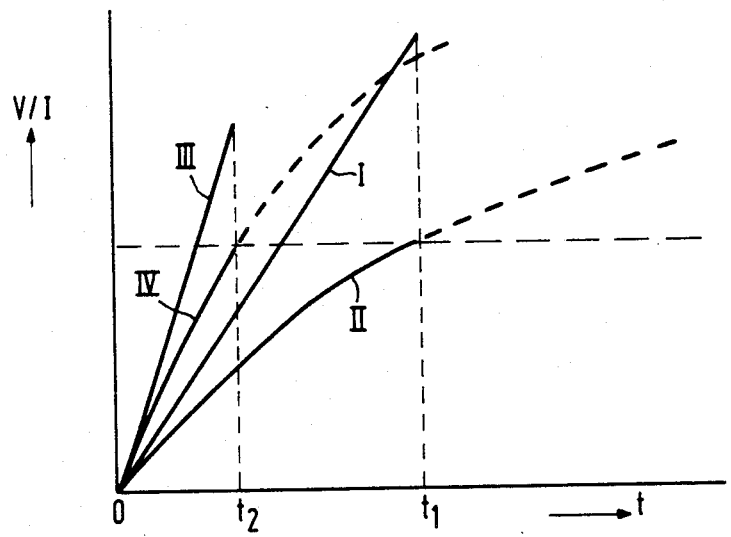
FIG. 7 shows some characteristic curves to illustrate the operation of the circuit shown in FIG. 6.

FIG. 6 shows a power-supply circuit in an embodiment in which a switching-frequency compensation in conjunction with the base-current compensation provides a satisfactory supply-voltage compensation. Identical parts bear the same reference numerals as in FIG. 1. The present embodiment does not include the resistor $R_2$ for measuring the primary current in the emitter line of the switching transistor $T_1$. A series arrangement of a resistor $R_{10}$ and a capacitor $C_7$ is arranged between the junction point of the secondary winding $n_2$ and the diode $D_1$ and the negative input-voltage terminal. A voltage divider comprising resistor $R_{11}$ and $R_{12}$ is arranged across the capacitor $C_7$ and has a tapping connected to the base of the control transistors $T_2$. A capacitor $C_8$ can be connected in parallel with the capacitor $C_7$ by means of a switch $S_2$, which is actuated simultaneously with the switch $S_1$. The operation of the circuit will be explained with reference to FIG. 7 which shows the variation of the primary current and the voltage across the capacitor $C_7$ as a function of time during the forward interval for two different supply voltages. For the first supply voltage $V_1$ the primary current during the forward interval increases in accordance with the characteristic I in the Figure. As the primary current increases, the voltage across the secondary causes the capacitor $C_7$ to be charged. The voltage across the capacitor $C_7$ varies in conformity with the characteistic II. The primary current is switched off at the instant $t_1$ at which the voltage across the capacitor $C_7$ has reached the level at which the control transistor $T_2$ is turned on via the voltage divider $R_{11}$, $R_{12}$ and consequently the transistor $T_1$ is turned off. For the second supply voltage $V_2$, which is approximately twice as high as the voltage $V_1$, the primary current during the forward interval increases twice as fast, as indicated by the characteristic III. Therefore, the secondary voltage also is doubled so that the capacitor $C_7$ is also charged at a faster rate, as is apparent from the characteristic IV. However, since the charging of the capacitor $C_7$ is a non-linear process, the voltage across the capacitor $C_7$ will reach the level at which the primary current is turned off in less than half the time required in the case of the input voltage $V_1$. In the present example, this time $t_2 = 0.4\ t_1$. The maximum value of the primary current at the input voltage $V_2$ is therefore smaller than in the case of the input volgage $V_1$. As the time during which the switching transistor $T_2$ is conductive decreases more than linearly for an increasing input voltage, the maximum value of the primary current decreases as the input voltage increases. This compensates for the effect of the increasing switching frequency on the output current. It is to be noted that the voltage level across the capacitor $C_7$ at which the primary current is turned off can be adjusted by means of a resistor arranged in the emitter line of the control transistor $T_2$.

The invention is not limited to the embodiments described above since many variations within the scope of the invention are conceivable to those skilled in the art.

What is claimed is:

1. A self-oscillating power-supply circuit for supplying a load with input voltages of different values comprising: a pair of input terminals for connection to a source of input voltage, a transformer with a primary winding and a secondary winding, means connecting the primary winding in series with the main-current path of a switching transistor between said pair of terminals, the switching transistor being turned off by means of a control transistor depending on a current proportional to the input voltage, a means connecting the secondary winding and diode in a series-combination that is in parallel with the load, a positive feedback loop comprising a capacitor in series with a first resistor coupled between one end of the secondary winding and the base of the switching transistor, characterized in that the positive feedback loop further comprises a second resistor in a series connection with the capacitor and the first resistor, and a zener diode connected between a circuit point in the series connection of the first resistor and the second resistor and that end of the main current path of the switching transistor whichis remote from the primary winding, the capacitor providing d.c. isolation between the circuit point and the secondary winding.

2. A self-oscillating power-supply circuit as claimed in claim 1, characterized in that the circuit comprises compensation means which, for higher values of the input voltage, turn off the switching transistor at lower values of the current through the primary winding.

3. A self-oscillating power-supply circuit as claimed in claim 2, characterized in that the compensation means comprise a third resistor connected in series with the main-current path of the switching transistor to one input-voltage terminal, means coupling the third resistor to a control electrode of the control transistor via the collector-emitter path of a transistor whose base is connected to its collector, to its emitter, and to the other input-voltage terminal by a fourth resistor, a fifth resistor, and a sixth resistor, respectively, and means connecting the control electrode to one input-voltage terminal via a seventh resistor.

4. A self-oscillating power-supply circuit as claimed in claim 2, characterized in that the compensation means comprise a third resistor connected in series with the main current path of the switching transistor to the one input-voltage terminal, said third resistor being coupled to a control electrode of the control transistor via the collector-emitter path of a transistor whose base is connected to its collector and to its emitter by a fourth resistor and a fifth resistor, respectively, and a second capacitor connected in parallel with the fourth resistor.

5. A self-oscillating power-supply circuit as claimed in claim 2, characterized in that said one end of the secondary winding is connected to one input-voltage terminal by the series arrangement of a third resistor and a second capacitor, a junction point of said third resistor and said second capacitor being coupled to a control electrode of the control transistor.

6. A self-oscillating power-supply circuit as claimed in claim 5, characterized in that the control electrode of the control transistor is connected to a trapping on a voltage divider connected in parallel with the second capacitor.

7. A self-oscillating power-supply circuit as claimed in claim 1 wherein the load is connected in series with the main current path of the switching transistor.

8. A self-oscillating power-supply circuit as claimed in claim 2 further comprising means for connecting the load in series with the main current path of the switching transistor.

9. A self-oscillating power-supply circuit for supplying a load from different level input voltages comprising: a pair of input terminals for the input voltage, a transformer having a primary winding and a secondary winding, means connecting the primary winding and a switching transistor in series across the input terminals, a control transistor coupled to a control electrode of the switching transistor to control the switching transistor into cut-off depending upon a current that is proportional to the input voltage, means connecting the secondary winding and a diode in a series-combination that is in parallel with the load, a positive feedback circuit coupling one end of the secondary winding to the control electrode of the switching transistor, said feedback circuit comprising a series circuit of a first resistor, a first capacitor and a second resistor, and current limiting means coupling an output electrode of the switching transistor to a circuit point in the feedback circuit so as to limit the current in the control electrode, and wherein the capacitor is connected in circuit so as to provide d.c. isolation between said circuit point and the secondary winding.

10. A power-supply circuit as claimed in claim 9 further comprising compensation means coupled to a control electrode of the control transistor and responsive to a current proportional to the primary winding current for adjusting, as a function of the primary winding current, the cutt-off of the switching transistor via said control transistor.

11. A power-supply circuit as claimed in claim 10 wherein said current limiting means comprises a zener diode and said primary winding current varies as a function of the amplitude level of the input voltage.

12. A power-supply circuit as claimed in claim 9 further comprising compensation means for compensating a change in output current resulting from a change in frequency of the switching transistor produced by a change in the input voltage, said compensation means comprising: a third resistor connected in series with the switching transistor, and means coupling the third resistor to a control electrode of the control transistor via the collector-emitter path of a transistor having a base connected to its collector and to its emitter via fourth and fifth resistors, respectively, and a sixth resistor coupling said transistor base to a d.c. supply voltage terminal of the power-supply circuit.

13. A power-supply circuit as claimed in claim 9 further comprising compensation means for compensating a change in output current resulting from a change in frequency of the switching transistor produced by a change in the input voltage, said compensation means comprising: a third resistor connected in series with the switching transistor, and means coupling the third resistor to a control electrode of the control transistor via the collector-emitter path of a transistor having a base connected to its collector and to its emitter via fourth and fifth resistors, respectively, and a second capacitor connected in parallel with the fourth resistor.

14. A power-supply circuit as claimed in claim 9 further comprising a compensation circuit coupling the one end of the secondary winding to a control electrode of the control transistor, said compensation circuit comprising, a third resistor and a second capacitor serially connected between said one end of the secondary winding and a point of reference potential, and means coupling a junction point of the third resistor and the second capacitor to said control electrode of the control transistor.

15. A power-supply circuit as claimed in claim 14 wherein the coupling means comprises a voltage divider coupled across the second capacitor and with a tap point connected to the control electrode of the control transistor.

16. A power-supply circuit as claimed in claim 9 wherein said current limiting means comprises a zener diode.

17. A power-supply circuit as claimed in claim 9 wherein said current limiting means comprises a zener diode connected between said switching transistor output electrode and a junction point between the capacitor and the second resistor.

18. A power-supply circuit as claimed in claim 10 wherein the load comprises at least one battery connected in series with the switching transistor.

* * * * *

UNITED STATES PATENT AND TRADEMARK OFFICE
CERTIFICATE OF CORRECTION

PATENT NO. : 4,652,984

DATED : March 24, 1987

INVENTOR(S) : Jouw van der Akker et al

It is certified that error appears in the above-identified patent and that said Letters Patent is hereby corrected as shown below:

IN THE CLAIMS

Claim 1, line 10  delete "a"

line 11  after "and" insert --a--

Signed and Sealed this

Twenty-first Day of February, 1989

Attest:

DONALD J. QUIGG

Attesting Officer

Commissioner of Patents and Trademarks